United States Patent [19]

Angioletti

[11] 4,351,366

[45] Sep. 28, 1982

[54] HEAT-INSULATED CONDUIT

[75] Inventor: Attilio Angioletti, Milan, Italy

[73] Assignee: Industrie Pirelli S.p.A., Milan, Italy

[21] Appl. No.: 192,558

[22] Filed: Sep. 30, 1980

[30] Foreign Application Priority Data

Oct. 24, 1979 [IT] Italy ................. 26735 A/79

[51] Int. Cl.³ .................................... F16L 9/14
[52] U.S. Cl. ............................. 138/149; 138/137; 138/122
[58] Field of Search ............... 138/149, 121, 122, 148, 138/137, 138, 134, 153, 172, DIG. 9

[56] References Cited

U.S. PATENT DOCUMENTS

| 3,030,250 | 4/1962 | Losse | 138/149 |
| 3,130,753 | 4/1964 | Monnen | 138/122 |
| 3,180,364 | 4/1965 | Ohlson | 138/122 |
| 3,289,703 | 12/1966 | Brown | 138/149 |
| 3,374,856 | 3/1968 | Wirt | 138/121 |
| 3,388,724 | 6/1968 | Mowell et al. | 138/149 |
| 3,547,162 | 12/1970 | Schaerer | 138/137 |

Primary Examiner—Willis Little
Attorney, Agent, or Firm—Stevens, Davis, Miller & Mosher

[57] ABSTRACT

A heat-insulated conduit provided by the invention has a tube, a sheath of heat insulating foamed material disposed around the tube, wires wound around the sheath of foamed material which deform the sheath locally along annular lines, and a tubular film disposed around the sheath in line or point contact with the deformed sheath.

11 Claims, 3 Drawing Figures

HEAT-INSULATED CONDUIT

The present invention relates to a thermally insulated conduit for conveying fluids having a temperature which is different from that of the surrounding atmosphere and, more particularly, to a tube provided around its outer surface with a sheath of insulating material.

It is known that the best heat insulation includes a layer of still air, that is air in which convective movements in the air are prevented.

For this reason, foamed synthetic resins are used as heat-insulating; i.e materials provided with a plurality of pores or cells filled with still air.

It is evident that taking a given volume, the heat insulation propreties of a layer of foamed material increase as the number of cavities or cells present in the volume of foamed material increases.

In any case, the heat insulation characteristics of the foamed material increase directly according to the thickness of the layer of foamed material used.

Consequently, when the type of foamed material to be used has been decided upon, it is known that increase of the thickness of the layer of the particular foamed material will increase the heat insulating properties of the insulation.

It follows that with the increase of the thickness of the insulating material, the cost and the weight of the insulation increase proportionally since the quantity of material to be used increases.

It is therefore an object of the invention to provide a conduit enclosed in a heat insulating layer of a cellular synthetic resin having improved heat insulating characteristics. Another object of the invention is to provide a conduit for conveying a fluid which has a layer of a foamed material disposed therearound having improved insulating properties against temperature change within the conduit. Still another object of the invention is to provide a conduit for conveying a fluid covered externally with a layer of foamed or cellular material having improved resistance to heat transfer over that of the same thickness of the same cellular material in a flat sheet configuration. A still further object of the invention is to provide a method for insulating a conduit against heat transfer towards or from the surrounding medium with a foamed insulating material wherein the heat-insulating characteristics are improved over the heat insulating characteristics per unit of thickness of the same foamed material when disposed as a flat sheet of substantially uniform thickness.

Other objects will become apparent from the following description with reference to the accompanying drawing wherein.

The foregoing objects and others are accomplished in accordance with this invention, generally speaking, by providing a conduit for conveying a fluid having a heat-insulating tube of a cellular synthetic resin substantially surrounding the external surface of the conduit and deformed inwardly at spaced points to provide annular rings of reduced cross-section with intermediate areas of larger cross-section and a film covering disposed around the heat insulating cellular tube in contact only with the surfaces of the tube at points of its maximum cross-section with intermediate air spaces external of the constricted rings of the foamed material. The invention thus provides a conduit insulated against heat loss or against heat absorption from its surroundings, having a tube through which the fluid flows, a covering of foamed heat insulating material surrounding the tube which is modified to increase its outer cross-section dimension.

In its more general form, the present invention provides a heat-insulated conduit for conveying fluids having a temperature which is different from that of the surrounding ambient, having a tube in which the fluid flows, a heat-insulating sheath of foamed material placed around the tube, means for deforming the sheath which increases at substantially uniformly distributed longitudinally spaced points the outermost cross-sectional dimensions of the insulation, and a covering for the tube and deformed sheath assembly which is in contact only with the points of increased cross-sectional dimensions.

Figure 1:
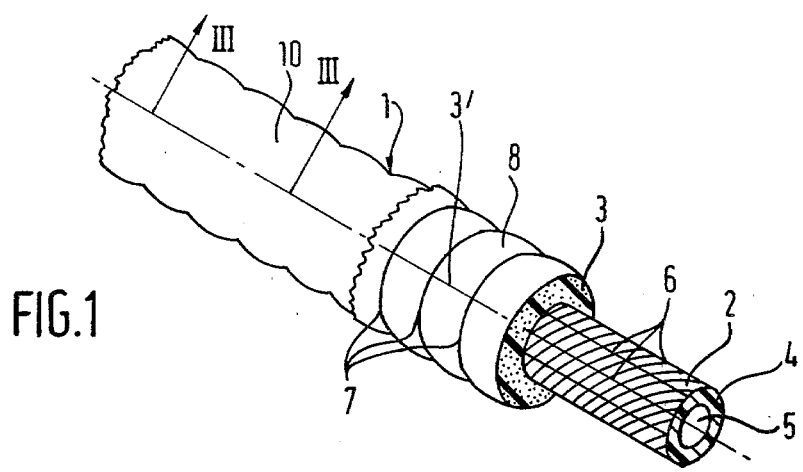
FIG. 1 is a perspective view with parts broken away of one embodiment of the invention.

One embodiment of a heat-insulated conduit for conveying fluids over a substantial distance which falls within the more general embodiment of the present invention is shown in perspective view and with parts broken away in FIG. 1.

As shown in FIG. 1, a heat-insulated conduit 1 having an elastomeric tube 2 surrounded by a sheath or layer 3 which is a layer of closed cell synthetic resin foamed material.

Layer 3 of foamed material is preferably a strip of sheet foamed material wound in a longitudinal sense around the tube 2.

The longitudinal extending edges of strip 3 are advanced into contact face to face along a straight line indicated with reference numeral 3'.

The longitudinally extending edges may or may not be firmly bonded to each other.

Moreover, a bond can be provided, for example, by means of a cement, between the tube 2 and the layer 3 of foamed material.

The layer 3 of foamed material may not be bonded to tube 2 and only wound around tube 2.

Tube 2, as shown in FIG. 1, is a shaped mass of elastomeric material 4 provided with a through bore 5 for flow of fluid to be conveyed over a distance.

A reinforcing structure of wires 6 for the shaped mass of elastomeric material 4, i.e. an insert which must withstand the pressure of the fluid flowing inside the through bore 5, is placed between the shaped mass of elastomeric material 4 and layer 8 of foamed material and comprises, for example, wires 6 some of which are helically wound and some which are placed longitudinally along the outer surface of the shaped mass of elastomeric material 4.

The heat-insulated conduit is further provided with means suitable for deforming layer 3 of foamed material so as to increase the outer cross-section dimensions of the sheath formed by the layer 3 of foamed material.

The deforming means, in the particular embodiment shown in FIG. 1, comprise a plurality of metal rings 7 inserted in and uniformly spaced around layer 3 of foamed material along the whole length of the heat-insulated conduit 1.

Rings 7 are preferably constituted by segments of wire having their ends twisted or otherwise fastened to one another so as to have a diameter smaller than the diameter of the tube-layer of foamed material assembly.

In this way rings 7 deform the layer 3 of foamed material causing an expansion of the same in the area or length between pairs of adjacent rings and therefore an increase in points of the outer cross-sectional dimensions of the sheath formed with the layer of foamed material.

Moreover, a tubular sheath is placed upon the layer of foamed material to be in contact with the points having the maximum cross-sectional dimensions of the sheath formed by layer 3 of foamed material, the tubular sheath being formed by a film 10 (see in particular FIG. 3) preferably of a material which is resistant to ultraviolet rays and to atmospheric agents, such as ozone.

Consequently, between outer surface 8 of the layer 3 of foamed material and the tubular sheath formed by the film 10 there are closed spaces 9 filled with air.

Since one function of film 10 is to protect the underlying layer of foamed material 3 from the ambient conditions, if it should be desired to utilize heat-insulated conduits 1 according to the present invention in protected places, film 10 can be colored and provided with resistance to the ambient conditions existing within the places.

Figure 3:
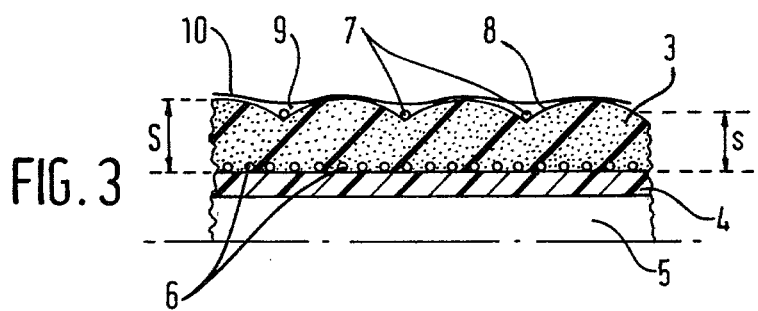
FIG. 3 is an enlarged longitudinal half-section taken along the lne II—III of FIG. 1.

Film 10, moreover, is preferably made to adhere to the outer surface 8 of the layer 3 of foamed material at the points of contact (see FIG. 3).

If the layer 3 of foamed material were to be of heat-weldable material, heat is supplied after the assembling of the insulated article 1 to heat seal the film 10 firmly to the outer surface 8 of layer 3 of foamed material.

In particular film 10 is of heat-shrinkable material so as to improve the binding effect between film 10 and layer 3, film 10 therefore tends to follow better the shape of the outer surface 8 of layer 3 of foamed material reducing of course the dimensions of the closed spaces 9.

Always if layer 3 of foamed material is to be heat-weldable, the larger ends of the strip of foamed material from which layer 3 is obtained, can be firmly butt-spliced to each other along their straight joining line 3' by means of a sintering welding or heat sealing operation, i.e. welding obtained by softening with heat only some points of the foamed material of the sides to be spliced and subsequently by pressing one side against the other and then cooling.

Welding can be obtained by means of a jet of hot air which softens points of the walls delimiting the cells of the foamed material on both faces to be joined avoiding collapse of cells during the compression action exerted in the zone where the edges of the strip of foamed material are butt-spliced.

Figure 2:
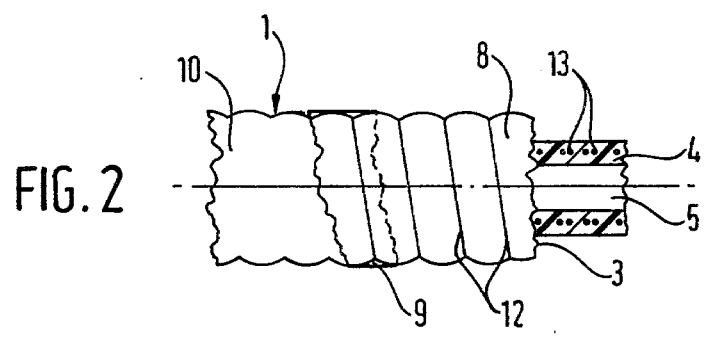
FIG. 2 is a side elevation, partially in section, of a length of heat insulated conduit forming a second embodiment of the invention.

An alternative embodiment of a heat-insulated conduit 11 for conveying liquids from place to place is shown in FIG. 2 partially in section and with parts broken away.

The same reference numerals, as those used in the description of FIGS. 1 and 3, are used to indicate the same elements of the heat-insulated conduit of foamed material.

The heat-insulated conduit 11 comprises a tube 2, constituted by a shaped mass 4 of elastomeric material and provided with a through hole or bore 5 within which the transported fluid flows.

The shaped mass 4 of elastomeric material comprises a wire reinforcement 13.

Around tube 2 there is a layer 3 of closed celled foamed material, obtained, for example, by winding around the tube 2 in the longitudinal direction a strip of closed celled foamed material.

A wire 12 is wound in a cylindrical helix from a single-start or multi-start, also opposite from one another (a single-start helix is shown in FIG. 2), around the outer surface 8 of layer 3 of foamed material.

The cyclindrical helix according to which wire 12 is wound, is wound on a base cylinder having a diameter smaller than the diameter of the tube foamed material assembly.

In the present invention as base cylinder it is understood that a cylinder obtained by translating the base circle of the helix along a straight line perpendicular to the plane of the circle itself is intended.

In other words, the base cylinder is that cylinder whose generatrices intersect all the convolutions of the cylindrical helix.

Wire 12 wound into a cylindrical helix around layer 3 of foamed material is an alternative embodiment of the means suitable for deforming layer 3 of foamed material so as to increase the outer cross-section dimension of the sheath formed with the layer of foamed material.

Moreover some closed spaces 9 filled with static air (see also FIG. 3) are formed by means of a film 10, of the type previously described and bonded to the outer surface 8 of the layer 3 of foamed material at the points having the larger cross-sectional dimensions between adjacent closed spaces 9.

Film 10 can be formed by a band of polyvinyl chloride polymer film wound helically as a strip around the tube and foam assembly with the lateral edges of the strip overlapped the one on the other to guarantee a continuity to the film 10.

Alternatively, film 10 can be extruded over the assembly of tube and foamed material.

From the previous description of some embodiments of the present invention and with the considerations given herebelow, it is apparent that the invention accomplishes its above stated objects.

In fact, deforming the foam insulating layer with rings or with a wire helically wound or the like as, for example, wire or thread, net or the like causes expansion of the foamed material in the zones between the adjacent lines which compress the foam radially outward.

The expansion produces an increase in the size of the cells of the foamed material in the zones between the deformation lines which thus gives rise to a larger volume of air, which is the real insulating element, in the zones with a consequent increase of the insulating capacity of the insulation.

It is true that this expansion occurs at the cost of compression or squeezing along lines of the layer of foamed material where obviously the insulating capacity is reduced, but the presence of the film-like tubular sheath arranged outwardly of the surface of the layer of foamed material and bonded to the expanded zones of the foamed material, leads to the formation of closed spaces full of air in correspondence of the deformed zones and therefore in these zones the insulation increases.

Moreover, by means of a heat-insulated conduit according to the present invention it is possible to bend the tube at a much smaller bending radius than is posible with the heat-insulated tubes of the prior art without the risks of collapsing the tube and because of the rings or helically wound wires which import a corrugated surface on the insulating layer of the tube, confer an overal greater flexibility to the conduit.

Although some particular embodiments of the invention have been illustrated and described, it is to be understood that the invention is not limited to such detail and other alternative embodiments known to those skilled in the art may be used.

In particular herebelow are indicated some suitable foams, by way of example only, which may be used for the insulating layer of the tube:

- foamed polyvinylchloride obtained by a chemical reaction wherein a nitrogen generating agent such as azodicarbonamide, compounded into the polyvinylchloride is decomposed by heat or mechanically by blowing air into the liquid mixture of polyvinylchloride;
- foamed polystyrene or polyethylene obtained by a chemical reaction wherein a nitrogen or carbon dioxide generating agent, compounded into the polystyrene or polyethylene, such as carbonates is decomposed by heat to form carbon dioxide;
- foamed polyurethane obtained by a chemical reaction between isocyanate, water and polyol such as to obtain the contemporaneous formation of a polymer and carbon dioxide;
- foamed neoprene rubber obtained by a chemical reaction wherein a carbonate or a azodicarbonamide, compounded into the rubber, is decomposed by heat to form respectively carbon dioxide or nitrogen.

I claim:

1. A conduit for conveying a fluid under pressure comprising a tube having a wall substantially impervious to fluids for flow of the fluid through the conduit, a layer of closed cell distortable cellular polyurethene resin surrounding the tube and insulating the tube against temperature change of the fluid, and a strand wound about the resulting insulated tube compressing the cellular polyurethene resin between convolutions of the wire and said tube thereby forming an undulated radially outward surface on the said resin layer with longitudinally spaced rings of compressed cellular polyurethene resin and wavelike intermediate convolutions of cellular resin bulging radially outwardly from adjacent convolutions of the wire, and an air impervious polymeric sheath having substantially smooth radially outer and inner surfaces surrounding the cellular polyurethene layer with the said inner surface disposed against the peaks of said wave-like convolutions and spaced radially outwardly of said rings enclosing space between the rings and sheath, said space being filled with static inert gas.

2. A conduit for conveying a fluid under pressure comprising a tube, an insulating layer of cellular polyurethene resin surrounding the tube, and a wire wound around the said layer compressing radially the said cellular synthetic resin between the wire and said tube thereby imparting an undulated external surface to the cellular resin layer with constricted rings corresponding to the convolutions of the wire and longitudinally extending raised areas therebetween which have a longitudinally extending arcuate shaped surface between adjacent convolutions, and a continuous, air impervious, synthetic resinous sheath surrounding the cellular synthetic resin, means bonding the said sheath to the points of maximum cross-section of the cellular synthetic resin and bridging the lines of restriction under the convolutions of wire thereby enclosing an air space between the surface of the constricted portions of the cellular synthetic resin, and said spaces being filled with a static inert gas.

3. A heat insulated conduit for conveying fluids consisting essentially of a tube and an insulating covering of foamed material around said tube, said insulating covering comprising a wire wound into a cylindrical helix around said foamed material, the base cylinder of said helix having a diameter smaller than the diameter of the assembly of tube and foamed material imparting a corrugated configuration to the assembly, whereby the outer cross-sectional dimension of the covering of foamed material is increased, and an air impervious covering film disposed in contact with the outer surface of the foamed material at the tops of the corrugations forming a series of spaces between the film and said outer surface with a static inert filling said spaces.

4. The conduit of claim 3, characterized by the fact of comprising closed spaces filled with an inert gas formed in the space overlying said rings.

5. The conduit of claim 3, characterized by the fact of comprising closed spaces filled with air formed in the space overlying said helically wound wire.

6. The conduit of claim 3, characterized by the fact that said film is heat-shrinkable and adhered to the surface of the foamed material in the points having the maximum outer cross-sectional dimensions.

7. The conduit of claim 3, characterized by the fact that said layer of foamed material is a strip of foamed material longitudinally wound around the tube.

8. The conduit of claim 8, characterized by the fact that the longer edges of said strip of foamed material longitudinally wound around the tube are in contact end to end with each other and are bonded to each other.

9. The conduit of claim 3, characterized by the fact that between said tube and said layer of foamed material there is a reinforcing structure for the tube.

10. The conduit of claim 5 having foamed insulation about said tube and a wire wound there around constricting the foamed material at spaced points along the length of the conduit with outwardly bulging segments therebetween and a sheath disposed around the insulation contacting the said bulging segments, spanning said points of constriction and forming a closed inert gas space between the constricted foam and the sheath.

11. A method for insulating a conduit against heat transfer comprising disposing a layer of a synthetic resinous foam about a tube for conveying a fluid, winding wire about the layer of foam and compressing the foam between the wire and tube to form longitudinally spaced rings therein with intermediate outwardly raised areas therebetween, enclosing the assembly of foam and tube in an air impervious synthetic polymeric film with the film disposed against said raised areas and spanning the compressed areas therebetween to form a series of spaces between the compressed foam and film, said spaces being filled with an inert gas.

* * * * *